(12) United States Patent
Schumann et al.

(10) Patent No.: US 6,733,075 B2
(45) Date of Patent: May 11, 2004

(54) VEHICLE SEAT WITH HEIGHT ADJUSTER

(75) Inventors: Kai Schumann, Rieschweiler (DE); Ingo Teufel, Rockenhausen (DE); Joachim Mühlberger, Obersülzen (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 10/462,560

(22) Filed: Jun. 16, 2003

(65) Prior Publication Data

US 2003/0213885 A1 Nov. 20, 2003

Related U.S. Application Data

(63) Continuation of application No. PCT/EP02/07768, filed on Jul. 12, 2002.

(30) Foreign Application Priority Data

Aug. 1, 2001 (DE) .......................................... 101 37 298

(51) Int. Cl.$^7$ ................................................. A47C 3/20
(52) U.S. Cl. ............................ 297/344.12; 297/216.1; 297/216.14
(58) Field of Search ....................... 297/344.12, 344.13, 297/216.1, 216.14, 216.15, 216.16

(56) References Cited

U.S. PATENT DOCUMENTS

| | | | | |
|---|---|---|---|---|
| 3,631,740 A | * | 1/1972 | Gavagan ................. 248/430 X |
| 3,848,923 A | * | 11/1974 | Dehler ........................ 297/366 |
| 3,957,304 A | * | 5/1976 | Koutsky et al. ...... 297/216.1 X |
| 3,977,725 A | * | 8/1976 | Tengler et al. ....... 297/216.1 X |
| 4,784,434 A | * | 11/1988 | Iwami ..................... 297/216.1 |
| 5,005,894 A | * | 4/1991 | Nagata ................ 297/216.2 X |
| 5,733,008 A | * | 3/1998 | Tame .................. 297/216.1 X |
| 5,836,647 A | * | 11/1998 | Turman ................... 297/216.1 |
| 5,882,061 A | | 3/1999 | Guillouet ................ 248/422 X |
| 6,109,690 A | * | 8/2000 | Wu et al. ............ 297/216.14 X |
| 6,112,370 A | * | 9/2000 | Blanchard et al. .. 297/216.14 X |
| 6,250,705 B1 | * | 6/2001 | Zuch .................... 297/216.1 X |
| 6,352,312 B1 | * | 3/2002 | Rees .................... 297/216.1 X |
| 6,478,378 B2 | | 11/2002 | Mühlberger et al. ... 297/344.12 |
| 6,505,888 B1 | * | 1/2003 | Teufel et al. ........ 297/216.1 X |
| 6,533,351 B2 | * | 3/2003 | Deptolla .............. 297/216.1 X |
| 6,572,065 B2 | * | 6/2003 | Koga et al. ......... 297/344.13 X |
| 2002/0011746 A1 | | 1/2002 | Mühlberger et al. ... 297/344.12 |
| 2003/0042771 A1 | | 3/2003 | Teufel et al. ............ 297/216.1 |

FOREIGN PATENT DOCUMENTS

DE       199 53 630 A1    5/2001

* cited by examiner

*Primary Examiner*—Peter M. Cuomo
*Assistant Examiner*—Rodney B. White
(74) *Attorney, Agent, or Firm*—Alston & Bird LLP

(57) ABSTRACT

In a vehicle seat, particularly a motor vehicle seat, having a height adjuster (25) for setting the height of a seat frame (10) of the vehicle seat (1) relative to an understructure (3) connected with the vehicle structure, a substantially irreversible change in the geometry of the height adjuster (25) in the event of a crash activates at least one crash locking device (27, 30), allowing an alternative force transfer between the seat frame (10) and the understructure (3).

17 Claims, 3 Drawing Sheets

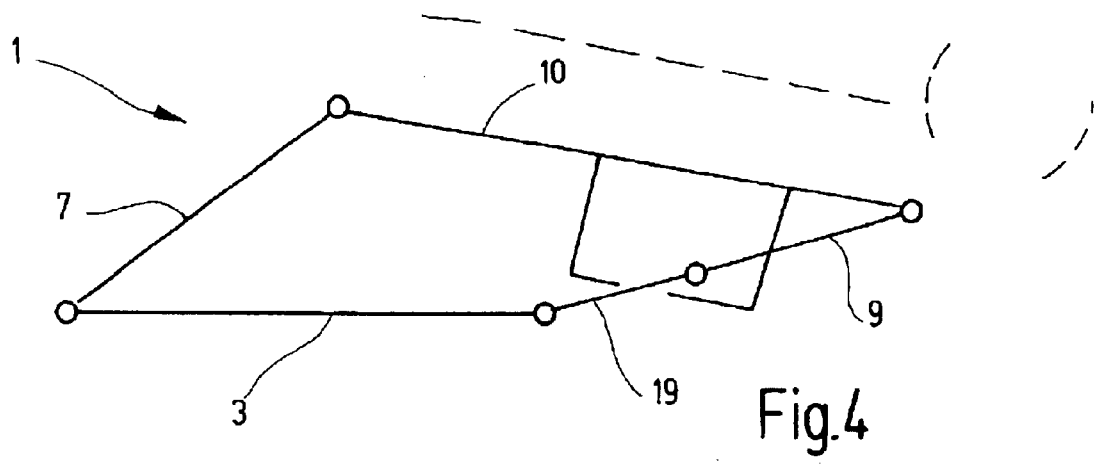
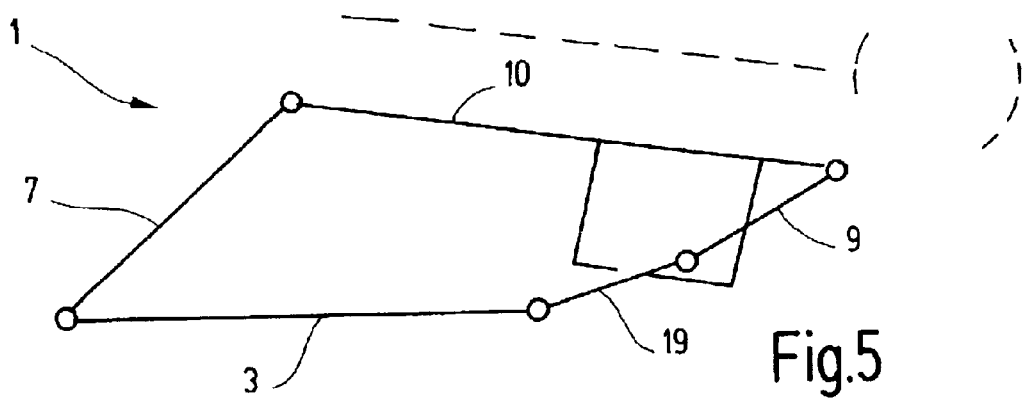
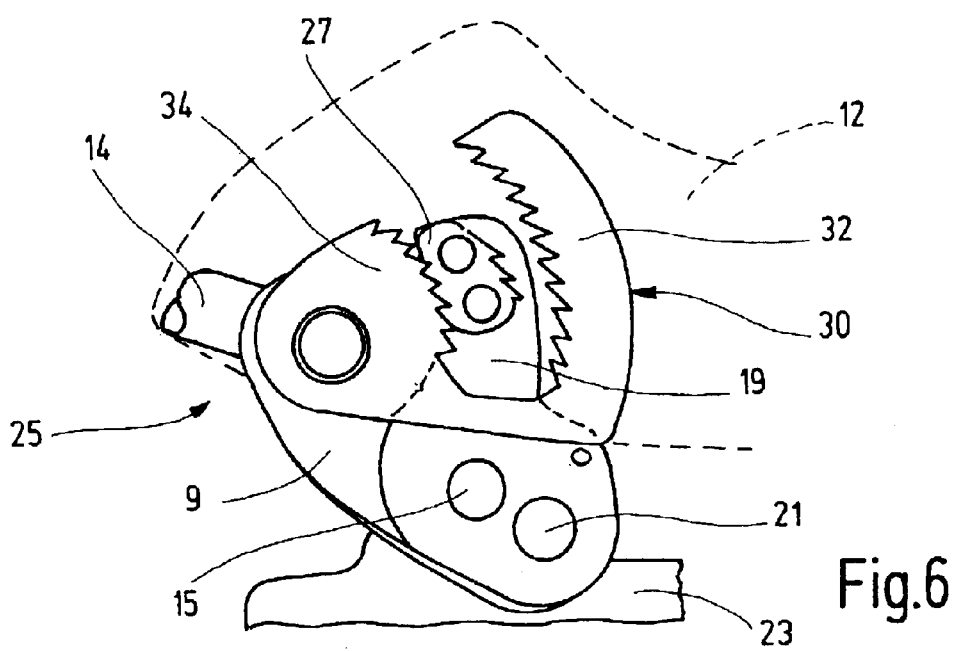

VEHICLE SEAT WITH HEIGHT ADJUSTER

CROSS-REFERENCE TO RELATED APPLICATION

This is a continuation of PCT/EP02/07768, which was filed Jul. 12, 2002, and is entirely incorporated herein by reference.

BACKGROUND OF THE INVENTION

The present invention relates to a vehicle seat, particularly a motor vehicle seat, having a height adjuster for setting the height of a seat frame of the vehicle seat relative to an understructure connected with the vehicle structure, wherein in the event of a crash, a change in the geometry of the height adjuster activates at least one crash locking device which provides an alternative force transfer between the seat frame and the understructure.

A vehicle seat of the above-described type, which is known from DE 199 53 630, has a motor that is effective between the seat frame and the rocker leg for driving the height adjuster, and the geometry of the height adjuster is reversibly changed in the event of a crash when a threshold force is exceeded in a spring-loaded pin and slot system, with a locking device providing additional force transfer between the seat frame and the vehicle structure. This additional force transfer, for example, discharges the drive of the height adjuster and locks the side of the height adjuster having no drive and located opposite the drive. The activation of the locking device is generally reversible, i.e. the vehicle seat can return to its original position.

BRIEF SUMMARY OF THE INVENTION

An aspect of the present invention is the provision of an improved vehicle seat, with a view to reducing the production costs. In accordance with this aspect, a vehicle seat, particularly a motor vehicle seat, has a height adjuster for setting the height of a seat frame of the vehicle seat relative to an understructure connected with the vehicle structure, wherein in the event of a crash, a change in the geometry of the height adjuster activates at least one crash locking device which provides an alternative force transfer between the seat frame and the understructure, characterized in that the change in the geometry of the height adjuster is substantially irreversible.

Due to the fact that the change in the geometry of the height adjuster is irreversible, the height adjuster can be constructed with simpler, more cost-effective and, for example, deformable elements. In comparison with the known vehicle seat, this will reduce the assembly time and production costs. As soon as the crash locking device is activated and locked, the force is transferred via the height adjuster directly and with optimal evenness. In particular, unlocked areas of the height adjuster, such as the side having no drive, are locked, thereby discharging the drive.

In a preferred arrangement, the geometry of the height adjuster is changed through releasing at least one additional degree of freedom of mobility of the height adjuster which, by reason of its increased movability, will then lock the crash locking device; this in turn will reduce the number of degrees of freedom of mobility, preferably causing the height adjuster to become rigid. The rigid locking of the height adjuster by means of the crash locking device can occur through interlocking surfaces such as toothed elements, or by friction caused, for example, by eccentrically curved friction surfaces, or through a combination of these.

In a preferred, easily manufacturable embodiment, the release of the additional degree of freedom of mobility occurs through a substantially irreversible change of status (e.g. deformation) of at least one connecting element holding together, in a fixedly mounted position, two components of the height adjuster which can normally be rotated relative to one another. In the event of a crash, the two components, following the substantially irreversible change of status of the connecting element, move, thereby locking the crash locking device. In a particularly preferred embodiment, which can be produced in a cost-effective way, the connecting element is in the shape of a pin with a predetermined breaking point, the forces bearing on the pin being shearing forces. Another version could also be to hold the two components together by means of a strong spring defining the threshold load.

In a preferred arrangement, the crash locking device functions in two different load directions, i.e. it is suitable for front-end and rear-end crashes. In order to be able, if necessary, to choose and increase the threshold loads independently, there is preferably a pin with a predetermined breaking point for each load direction. Locking can occur through two independent locking devices, or, in order to reduce the number of components, can occur by means of a locking device that functions in both directions, having, for example, a movable locking element acting jointly with different locking counter-elements according to the load direction. The movable locking element can consist of several components or, to save space, of a monoblock also providing the additional joint for the additional degree of freedom of mobility of the height adjuster.

BRIEF DESCRIPTION OF THE DRAWINGS

The invention is explained in greater detail with reference to two exemplary embodiments illustrated in the drawings, in which:

FIG. 4 is a schematic representation of the structure of the first exemplary embodiment in a normal use position, FIG. 5 is a representation as in FIG. 4 in the event of a front-end crash, FIG. 6 is a perspective partial view of the first exemplary embodiment without the lateral part of the seat frame and the pawl plate in the outer area of the right rear rocker leg, in the event of a front-end crash.

DETAILED DESCRIPTION OF THE INVENTION

Figure 1:
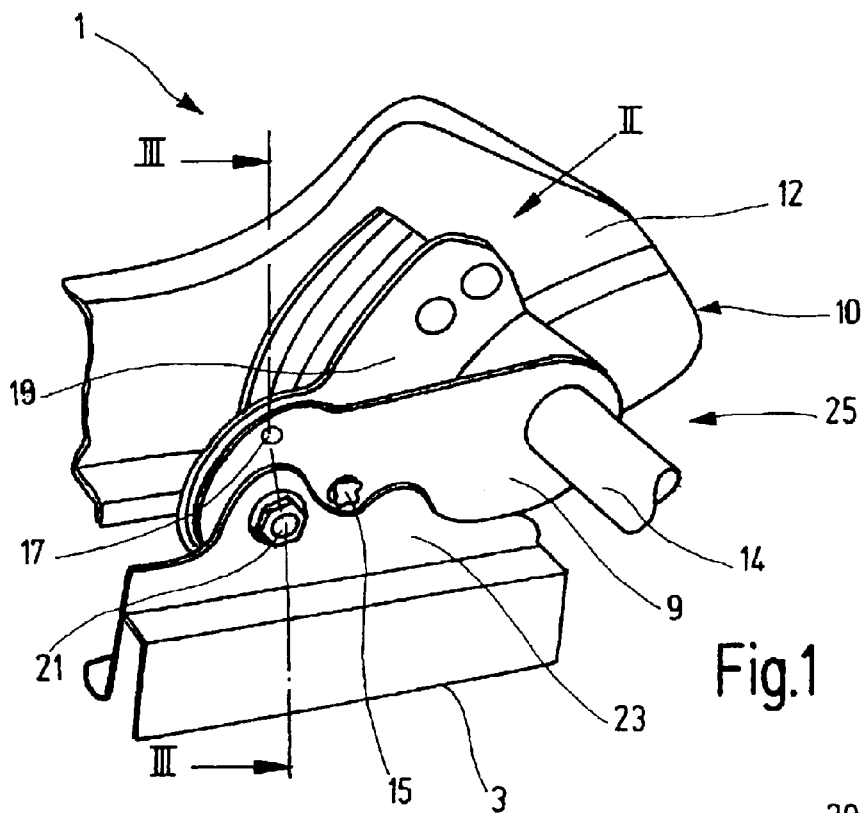
FIG. 1 is a perspective partial view of the first exemplary embodiment in the inner area of the right rear rocker leg in the normal use position.
Figure 2:
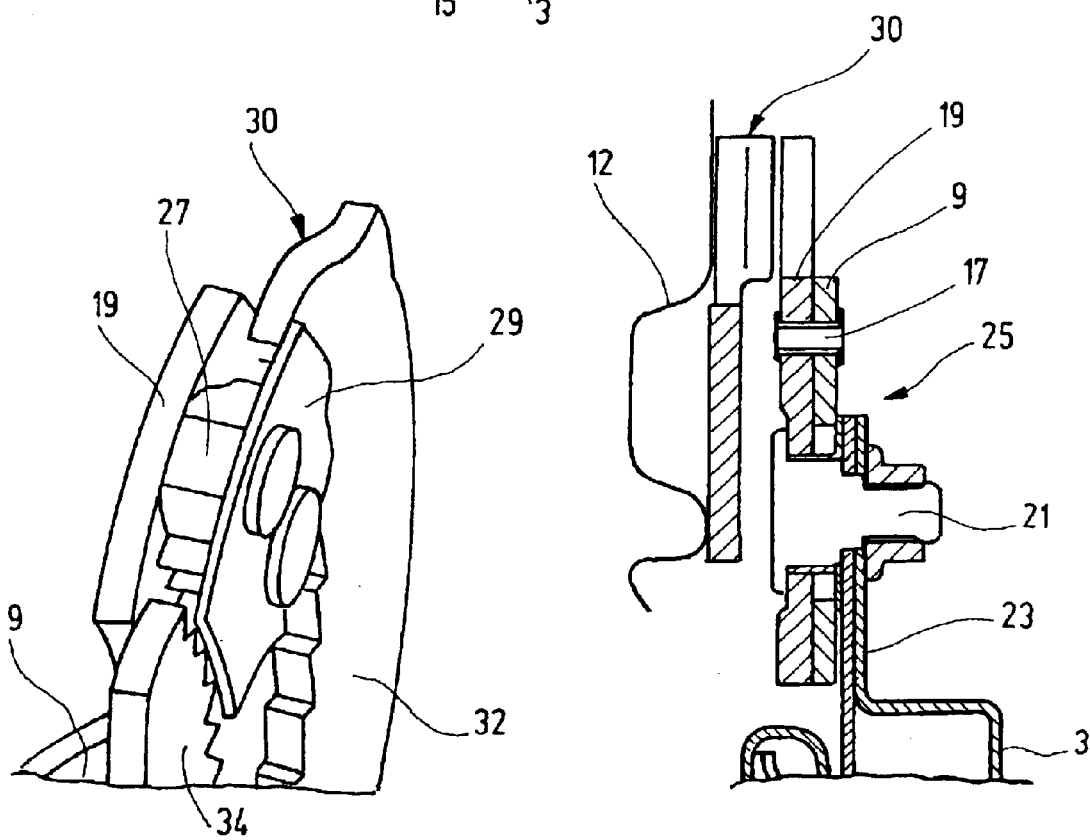
FIG. 2 is a partial view in the direction of the arrow II in FIG. 1.
Figure 3:
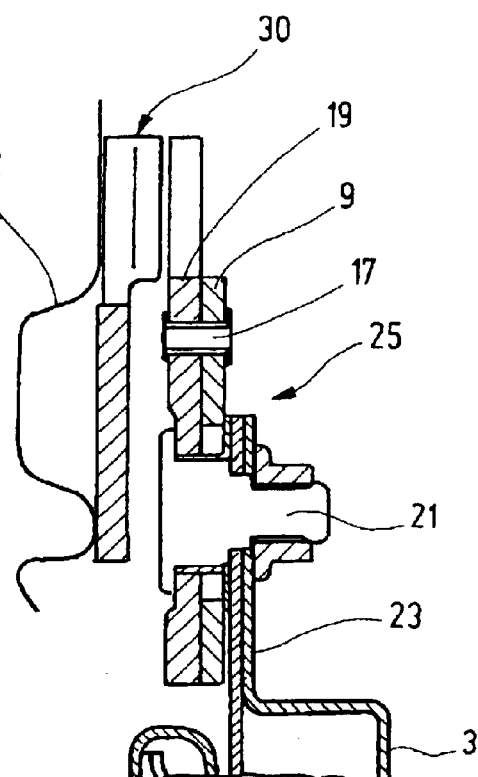
FIG. 3 is a section along the line III—III in FIG. 1.
Figure 7:
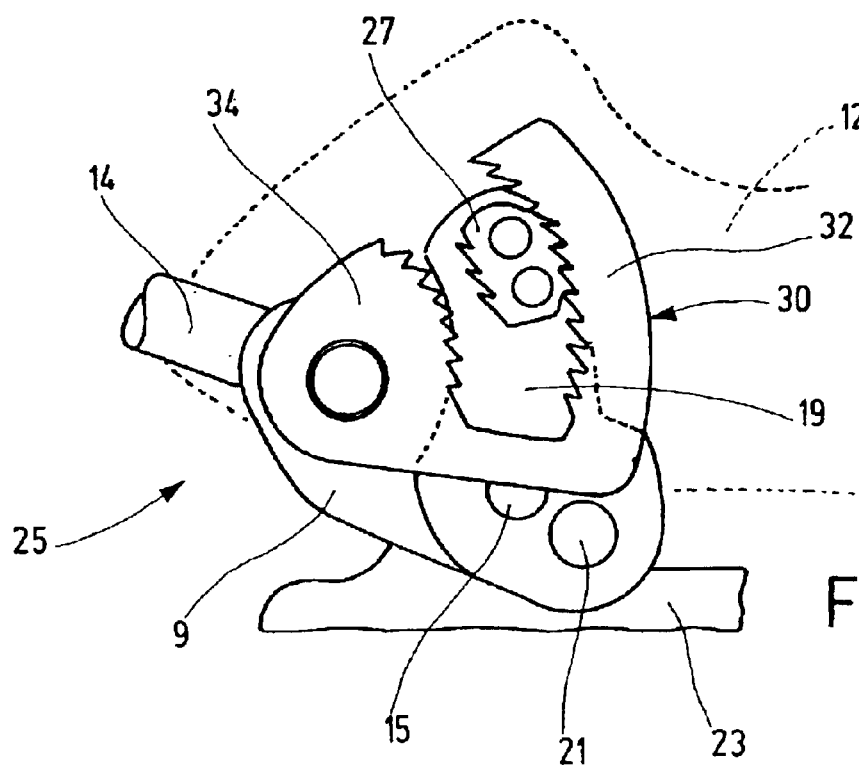
FIG. 7 is a representation as in FIG. 6 in the event of a rear-end crash.
Figure 8:
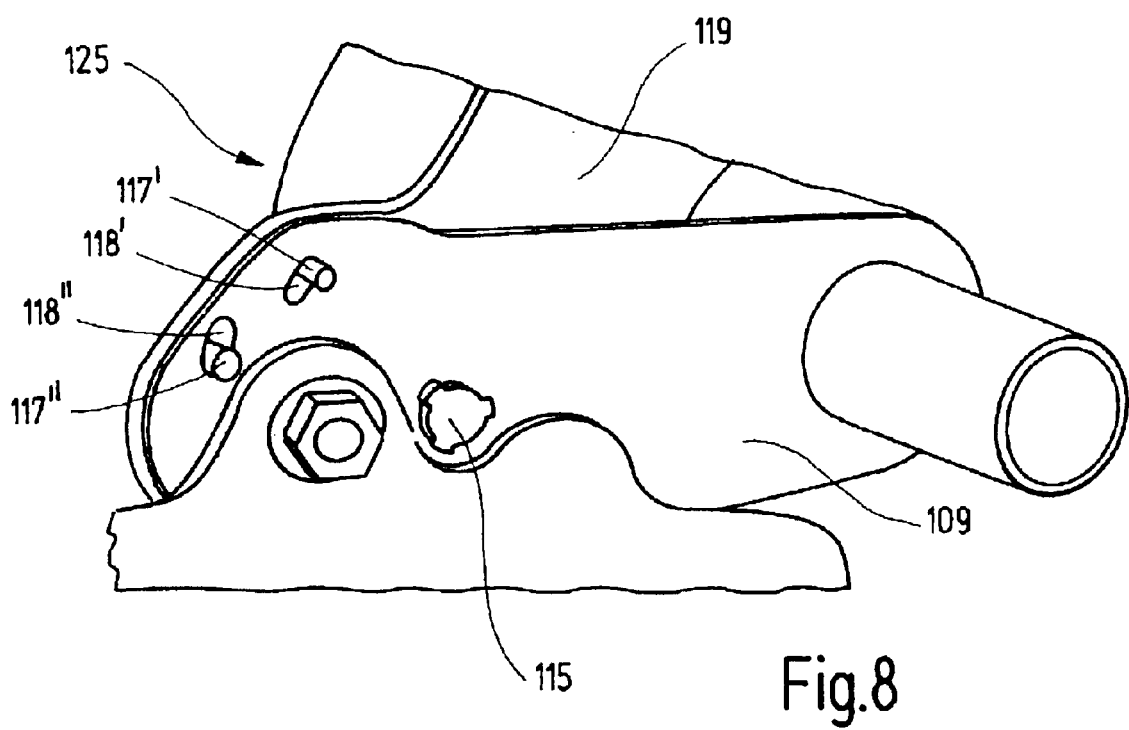
FIG. 8 is a perspective partial view of the second exemplary embodiment in the inner area of the right rear rocker leg, in a normal use position.

A vehicle seat 1 in the form of a driver's seat in a motor vehicle has, as a vehicle structure-fixed understructure 3, one pair of seat rails on each of its two sides for lengthwise adjustment. For a motor-driven height adjustment, front rocker legs 7 are movably mounted at their lower ends on the understructure 3, and rear rocker legs 9 are movably mounted in a way which will be described later. The rocker legs 7 and 9 are movably mounted with their upper ends on a seat frame 10 bearing the seat cushion and the backrest of the vehicle seat 1. The seat frame 10 consists mainly of two seat frame side components 12, a front seat frame transverse bar, and a rear seat frame transverse bar 14, all parts being fixedly connected to one another. The rear rocker legs 9 are movably mounted on the tube-shaped transverse bar 14 at the rear-end of the seat frame. For increased clarity, we shall now describe the right side of the vehicle seat facing the drive shaft. The left side of the vehicle seat facing the sill is preferably structured in an analogous manner.

In the area of the lower end of the rear rocker leg 9, a pawl 19 is initially mounted rotation-fixedly on the rear rocker leg 9 by means of a rotating connection 15 and a shear pin 17 arranged in front of the rotating connection 15 in the direction of travel. The shear pin 17, for example, is in the shape of a blind rivet. The pawl 19 is movably mounted on an adapter 23 of the understructure 3 by means of a journaling bolt 21. The rear rocker leg 9 extends around the journaling bolt 21 at a distance. The entire height adjuster referred to as 25 thus includes the understructure 3, the front and rear rocker legs 7 and 9, the seat frame 10 and the pawls 19. When normally used as described, the height adjuster 25 is in the shape of a quadruple joint on each side of the vehicle seat.

On its free upper end, the pawl 19 has a flat toothed element 27 on the side facing away from the vehicle seat 1. The toothed element 27 has a radially outer (relative to the rear seat frame transverse bar 14) toothed part pointing approximately towards the front and upwards, and a radially inner (relative to the rear seat frame transverse 14) toothed part pointing approximately towards the rear and downwards. On the side of the toothed element 27 that is facing outward, there is a pawl plate 29 covering the toothed element 27. In the exemplary embodiment, the pawl 19, the toothed element 27 and the pawl plate 29 are fixedly connected by means of two rivets, but they can also be connected in a different manner or can, at least in part, be a monoblock.

A toothed segment 30 is fixedly mounted on the seat frame side component 12 in the immediate proximity of the toothed element 27. The toothed segment 30 has a radially outer (relative to the seat frame rear transverse bar 14) toothed arch 32 curved around the seat frame transverse bar 14, having a toothed part pointing radially inward, and a radially inner (relative to the seat frame transverse bar 14) toothed arch 34, with a toothed part pointing radially outward, also curved around the seat frame transverse bar 14. During normal use of the height adjuster 25, the toothed element 27 moves on a path arching around the rear seat frame transverse bar 14 in the space between the two toothed arches 32 and 34 that are part, at their lower ends, of the same component. The length of the toothed arches 32 and 34 is therefore adjusted to the possible pivoting angle of the height adjuster 25. The pawl 19 and the pawl plate 29 overlap the two toothed arches 32 and 34 at least partially, thus securing them in an axial direction.

In the event of a front-end crash, the seat frame 10, together with the other components of the vehicle seat 1 that are mounted on it, and with the passenger, is accelerated towards the front relative to the understructure 3. Initially, the forces occurring are transferred from the seat frame 10 via the rocker legs 7 and 9, including the pawl 19, into the understructure 3 and from there into the vehicle structure. As regards the rotating connection 15, there is a turning moment bearing on the rear rocker leg 9, attempting to turn the rear rocker leg 9 upward (relative to the pawl 19). At a defined threshold load (e.g., at a predetermined load), the shear pin 17 is destroyed. The height adjuster 25 now has an additional degree of freedom, i.e. it forms a quintuple joint. The rear rocker leg 9 now turns around the rotating connection 15 (relative to the pawl 19), thereby allowing the seat frame 10 to move, i.e. the geometry of the height adjuster 25 is changed. The toothed segment 30 mounted on the seat frame 10 now interlocks with the toothed element 27 of the pawl 19 as a crash locking device by way of the radially inner toothed arch 34. Through this reduction of the degrees of freedom, a triple joint is now formed, i.e. the rotationally-fixed connection of the seat frame 10 to the rear rocker leg 9 prevents any further movement of the height adjuster 25. A portion of the forces bearing on the seat frame 10 is now transferred directly from the seat frame 10 via the pawl 19 into the understructure 3 and thereby into the vehicle structure, bypassing the rear rocker leg 9. This alternative force transfer discharges the drive of the height adjuster 25 operating between the rear rocker leg 9 and the seat frame 10, blocking the height adjuster 25 on the side of the vehicle seat without the drive, thereby also preventing any force transfer between the sides of the vehicle seat and, consequently, a one-sided overload.

Correspondingly, in the event of a rear-end crash, the seat frame 10, including the passenger, is accelerated toward the rear relative to the understructure 3 of the vehicle seat 1. At this moment, a turning moment bears on the pawl 19 via the understructure 3, attempting to turn it relative to the rear rocker leg 9. The shear pin 17 breaks when the defined threshold load is exceeded, thereby causing a relative rotation between the pawl 19 and the rear rocker leg 9. Through the additional degree of freedom, the height adjuster 25 also temporarily becomes a quintuple joint. The pawl 19 now advances into the radially outer toothed arch 32, which interlocks with the pawl's toothed element 27. The height adjuster 25, through this activation of the crash locking device, becomes a triple joint again, i.e. it becomes rigid. As in the event of a front-end crash, the alternative force transfer from the seat frame 10 via the locked crash locking device, the pawl 19 and the understructure 3 into the vehicle structure in turn discharges the drive of the height adjuster and locks the side without the drive.

The second exemplary embodiment is largely similar to the first exemplary embodiment; therefore, the reference signs for identical components or components with identical functions are increased by 100. In the height adjuster 125, there is a thinner front-end crash shear pin 117' and a thicker rear-end crash shear pin 117" to obtain a rotation-fixed connection between the rear rocker leg 109 and the pawl 119, which can be rotated relative to one another around a rotating connection 115. In a normal position, the front-end crash shear pin 117' is arranged at the upper end of a front-end crash slotted link 118' of the rear rocker leg 109 and the rear-end crash shear pin 117" at the lower end of a rear-end crash slotted link 118" of the rear rocker leg 109. In the event of a crash, the mode of functioning of the exemplary embodiment, particularly the shear pins, is identical to that of the first exemplary embodiment. However, the threshold load of the rear-end crash shear pin 117" is higher than that of the front-end crash shear pin 117', i.e. it breaks only at higher crash forces.

That which is claimed:

1. A vehicle seat for being mounted to a vehicle structure and for performing advantageously in the event of a crash, the vehicle seat comprising:
    a height adjuster mounted between a seat frame and an understructure for adjusting a height of the seat frame relative to the understructure, wherein the understructure is for being connected to the vehicle structure, the height adjuster is operative so that a change in geometry of the height adjuster occurs in the event of a crash in which the vehicle seat experiences at least a predetermined load, and the change in the geometry of the height adjuster is substantially irreversible; and at least one locking device mounted for locking in response to the change in geometry to provide an alternative force transmission path between the seat frame and the understructure, wherein:

the height adjuster is operative so that at least one additional degree of freedom of mobility is added to the height adjuster in the event of the crash, and the additional degree of freedom of mobility at least partially facilitates the change in the geometry of the height adjuster, the height adjuster includes:
at least two components that are mounted for there being relative rotation therebetween, with the change in geometry including there being relative rotation between said two components, and
a connecting element which holds together said two components to restrict the relative rotation therebetween, the connecting element is operative for deforming in the event of the crash so that the connecting element no longer holds together said two components to restrict the relative rotation therebetween, whereby the additional degree of freedom of mobility is added to the height adjuster, the locking device includes a locking element that is stationary with respect to the seat frame during the adjusting of the height of the seat frame prior to the crash, and the locking element is engaged to a locking element of one of said two components while the locking device is locked.

2. A vehicle seat according to claim 1, wherein the additional degree of freedom of mobility causes the change in the geometry of the height adjuster to result in the locking of the locking device.

3. A vehicle seat according to claim 2, wherein the locking of the locking device causes degrees of freedom of mobility of the height adjuster to be reduced by at least two.

4. A vehicle seat according to claim 1, wherein the connecting element comprises at least one pin with a predetermined breaking point.

5. A vehicle seat according to claim 1, wherein the locking device is operative for functioning in two different load directions.

6. A vehicle seat according to claim 5, wherein the connecting element comprises:
a pin with a predetermined breaking point for one of the load directions; and
another pin with a predetermined breaking point for the other load direction.

7. A vehicle seat according to claim 1, wherein:
the change in geometry is a first change in geometry,
the height adjuster is operative so that the first change in geometry of the height adjuster occurs in the event of a crash in which the vehicle seat experiences at least the predetermined load in a first direction,
the height adjuster is operative so that a second change in geometry of the height adjuster occurs in the event of a crash in which the vehicle seat experiences at least a predetermined load in a second direction, with the first and second directions being different from one another and the second change in the geometry of the height adjuster being substantially irreversible, the locking element of the one of said two components is a first locking element, the locking element that is stationary with respect to the seat frame during the adjusting of the height of the seat frame prior to the crash is first locking counter-element, the locking device further includes a second locking counter-element that is stationary with respect to the seat frame during the adjusting of the height of the seat frame prior to the crash, and the first locking element is mounted for:
moving into engagement with the first locking counter-element, rather than into engagement with the second locking counter-element, for locking purposes in response to the first change in geometry, and
moving into engagement with the second locking counter-element, rather than into engagement with the first locking counter-element, for locking purposes in response to the second change in geometry.

8. A vehicle seat according to claim 7, wherein:
the height adjuster and the first locking element are arranged so that the first locking element travels along a path during the adjusting of the height of the seat frame prior to the crash, and the first and second counter-elements are positioned on opposite sides of the path from one another.

9. A vehicle seat according to claim 8, wherein the connecting element comprises at least one pin with a predetermined breaking point.

10. A vehicle seat according to claim 7, wherein:
the first counter-element is a first toothed segment mounted to the seat frame so that the first toothed segment is stationary with respect to the seat frame during the adjusting of the height of the seat frame prior to the crash, the second counter-element is a second toothed segment mounted to the seat frame so that the second toothed segment is stationary with respect to the seat frame during the adjusting of the height of the seat frame prior to the crash, the first locking element is a toothed element, whereby:
the toothed element moves into engagement with the first toothed segment, rather than into engagement with the second toothed segment, for locking purposes in response to the first change in geometry, and
the toothed element moves into engagement with the second toothed segment, rather than into engagement with the first toothed segment, for locking purposes in response to the second change in geometry.

11. A vehicle seat according to claim 10, wherein:
the height adjuster and the toothed element are arranged so that the toothed element travels along a path during the adjusting of the height of the seat frame prior to the crash, and the first and second toothed segments are positioned on opposite sides of the path from one another.

12. A vehicle seat according to claim 1, wherein:
the locking element that is stationary with respect to the seat frame during the adjusting of the height of the seat frame prior to the crash is a toothed segment mounted to the seat frame so that the toothed segment is stationary with respect to the seat frame during the adjusting of the height of the seat frame prior to the crash, and the locking element of the one of said two components is a toothed element, whereby the toothed segment is engaged to the toothed element while the locking device is locked.

13. A vehicle seat according to claim 1, wherein:

the at least two components of the height adjuster includes:

a pawl pivotably mounted to the understructure for pivoting relative to the understructure during the adjusting of the height of the seat frame, and a leg pivotably mounted to the seat frame for there being relative pivoting between the leg and the seat frame during the adjusting of the height of the seat frame, with the leg also being mounted to the pawl for there being relative pivoting between the pawl and the leg in the event of the crash, with the change in geometry including there being the relative pivoting between the pawl and the leg;

the connecting element holds together the pawl and the leg to restrict the relative pivoting between the pawl and the leg prior to the crash, wherein the connecting element is operative for deforming in the event of the crash so that the connecting element no longer holds together the pawl and the leg to restrict the relative pivoting therebetween;

the locking element that is stationary with respect to the seat frame during the adjusting of the height of the seat frame prior to the crash is a toothed segment mounted to the seat frame, and the locking element of the one of said two components is a toothed element of the pawl, whereby the toothed segment is for lockingly engaging the toothed element of the pawl in response to the relative pivoting between the pawl and the leg, with the locking of the locking device comprising the engagement between the toothed segment and the toothed element, and the alternative force transmission path extending through the pawl; and the height adjuster is configured so that relative pivoting between the leg and the seat frame is prevented while the toothed segment is lockingly engaging the toothed element.

14. A vehicle seat according to claim 13, wherein the connecting element comprises at least one pin with a predetermined breaking point.

15. A vehicle seat according to claim 13, wherein the connecting element includes at least one shear pin that is mounted between the pawl and the leg.

16. A vehicle seat according to claim 1, wherein:

the change in geometry is a first change in geometry, the height adjuster is operative so that the first change in geometry of the height adjuster occurs in the event of a crash in which the vehicle seat experiences at least the predetermined load in a first direction, the connecting element comprises at least a first pin with a predetermined breaking point in the first direction, the height adjuster further includes at least a second pin with a predetermined breaking point in a second direction that is different from the first direction, so that a second change in geometry of the height adjuster occurs in the event of a crash in which the vehicle seat experiences at least a predetermined load in the second direction, with the second change in geometry including there being relative rotation between said two components, and the locking device locks in response to the second change in geometry to provide an alternative force transmission path between the seat frame and the understructure.

17. A vehicle seat for being mounted to a vehicle structure and for performing advantageously in the event of a crash, the vehicle seat comprising:

a height adjuster mounted between a seat frame and an understructure for adjusting a height of the seat frame relative to the understructure, wherein the understructure is for being connected to the vehicle structure, and the height adjuster includes:

a pawl pivotably mounted to the understructure for pivoting relative to the understructure during the adjusting of the height of the seat frame, a leg pivotably mounted to the seat frame for there being relative pivoting between the leg and the seat frame during the adjusting of the height of the seat frame, with the leg also being mounted to the pawl for there being relative pivoting between the pawl and the leg in the event of a crash in which the vehicle seat experiences at least a predetermined load, and a shear pin connecting the pawl to the leg to restrict relative pivoting between the pawl and the leg prior to the crash, wherein the shear pin is for breaking in the event of the crash so that there is relative pivoting between the pawl and the leg in the event of the crash; and at least one locking device including a toothed segment mounted to the seat frame for lockingly engaging a toothed element of the pawl in response to the relative pivoting between the pawl and the leg, to provide an alternative force transmission path between the seat frame and the understructure, wherein the height adjuster is configured so that relative pivoting between the leg and the seat frame is prevented while the toothed segment is lockingly engaging the toothed element, and wherein the toothed segment is mounted to the seat frame so that the toothed segment is stationary with respect to the seat frame during the adjusting of the height of the seat frame prior to the crash.

* * * * *